(12) United States Patent
Shimoji et al.

(10) Patent No.: US 9,201,144 B2
(45) Date of Patent: Dec. 1, 2015

(54) ACTIVE OBJECT DETECTION SENSOR

(71) Applicant: OPTEX CO., LTD., Shiga (JP)

(72) Inventors: Kenta Shimoji, Otsu (JP); Takayasu Ikeda, Otsu (JP); Masayuki Shimazu, Otsu (JP); Takuya Maeda, Otsu (JP)

(73) Assignee: OPTEX CO., LTD., Shiga (JP)

( * ) Notice: Subject to any disclaimer, the term of this patent is extended or adjusted under 35 U.S.C. 154(b) by 0 days.

(21) Appl. No.: 14/555,977

(22) Filed: Nov. 28, 2014

(65) Prior Publication Data
US 2015/0160339 A1    Jun. 11, 2015

(30) Foreign Application Priority Data

Dec. 10, 2013   (JP) ................................ 2013-254721

(51) Int. Cl.
| | |
|---|---|
| G01S 17/02 | (2006.01) |
| G01J 5/00 | (2006.01) |
| G01S 17/46 | (2006.01) |
| G01S 7/481 | (2006.01) |

(52) U.S. Cl.
CPC ............. G01S 17/026 (2013.01); G01J 5/0025 (2013.01); G01S 7/4815 (2013.01); G01S 7/4816 (2013.01); G01S 17/46 (2013.01)

(58) Field of Classification Search
CPC .............................. G01S 17/026; G01J 5/0025
See application file for complete search history.

(56) References Cited

U.S. PATENT DOCUMENTS

| 7,030,364 B2 | 4/2006 | Matsuyama et al. |
| 2005/0035277 A1 | 2/2005 | Matsuyama et al. |
| 2010/0321676 A1 | 12/2010 | Sasaki et al. |

FOREIGN PATENT DOCUMENTS

| JP | 2004-170128 A | 6/2004 |
| JP | 2009-115792 A | 5/2009 |
| JP | 2009-122044 A | 6/2009 |
| JP | 2013-050368 A | 3/2013 |
| JP | 2013-072863 A | 4/2013 |

OTHER PUBLICATIONS

The extended European search report issued by the European Patent Office on May 19, 2015, which corresponds to European Patent Application No. 14195518.7-1812 and is related to U.S. Appl. No. 14/555,977.

*Primary Examiner* — Mark R Gaworecki
(74) *Attorney, Agent, or Firm* — Studebaker & Brackett PC (57) ABSTRACT

Transmitter elements to transmit a detection ray for object detection, to a transmission area, receiver elements to receive, from a reception area, the detection ray reflected by an object, and a transmission-side optical divider and a reception-side optical divider, disposed in front of the transmitter elements and the receiver elements, respectively, which includes optical dividing pieces having optical deflection surfaces on which a traveling direction angle of the detection ray is varied to angles so as to correspond to division areas, are provided. In the optical dividers, a ratio of an area of a second optical deflection surface that forms a division area that is closer to the sensor, relative to an area of a first optical deflection surface that forms a division area that is farther from the sensor, is set so as to be different between a transmission side and a reception side.

4 Claims, 7 Drawing Sheets

ACTIVE OBJECT DETECTION SENSOR

CROSS REFERENCE TO THE RELATED APPLICATION

This application is based on and claims Convention priority to Japanese patent application No. 2013-254721, filed Dec. 10, 2013, the entire disclosure of which is herein incorporated by reference as a part of this application.

BACKGROUND OF THE INVENTION

1. Field of the Invention

The present invention relates to an active object detection sensor that transmits detection rays for object detection toward a detection area, and detects an object based on a reception signal generated when receiving detection rays reflected by the object.

2. Description of Related Art

To date, an active object detection sensor has been known which transmits detection rays, such as infrared rays or near infrared rays, for object detection, from a transmitter toward a detection area, causes a receiver to receive detection rays reflected by an object and to generate a reception signal, and detects an object such as a human body when the reception signal is determined as having a level that exceeds a setting level.

As an example of the active object detection sensor, the use is made of a sensor that forms a detection area divided into a plurality of division areas, to arrange plural columns of the division areas in the lateral direction, and arrange plural rows of the division areas in the longitudinal direction from a position close to the sensor toward a position distant from the sensor (for example, Japanese Laid-Open Patent Publication No. 2009-115792). The active object detection sensor is, for example, used for an automatic door sensor so as to detect an object for the automatic door.

Figure 3A:
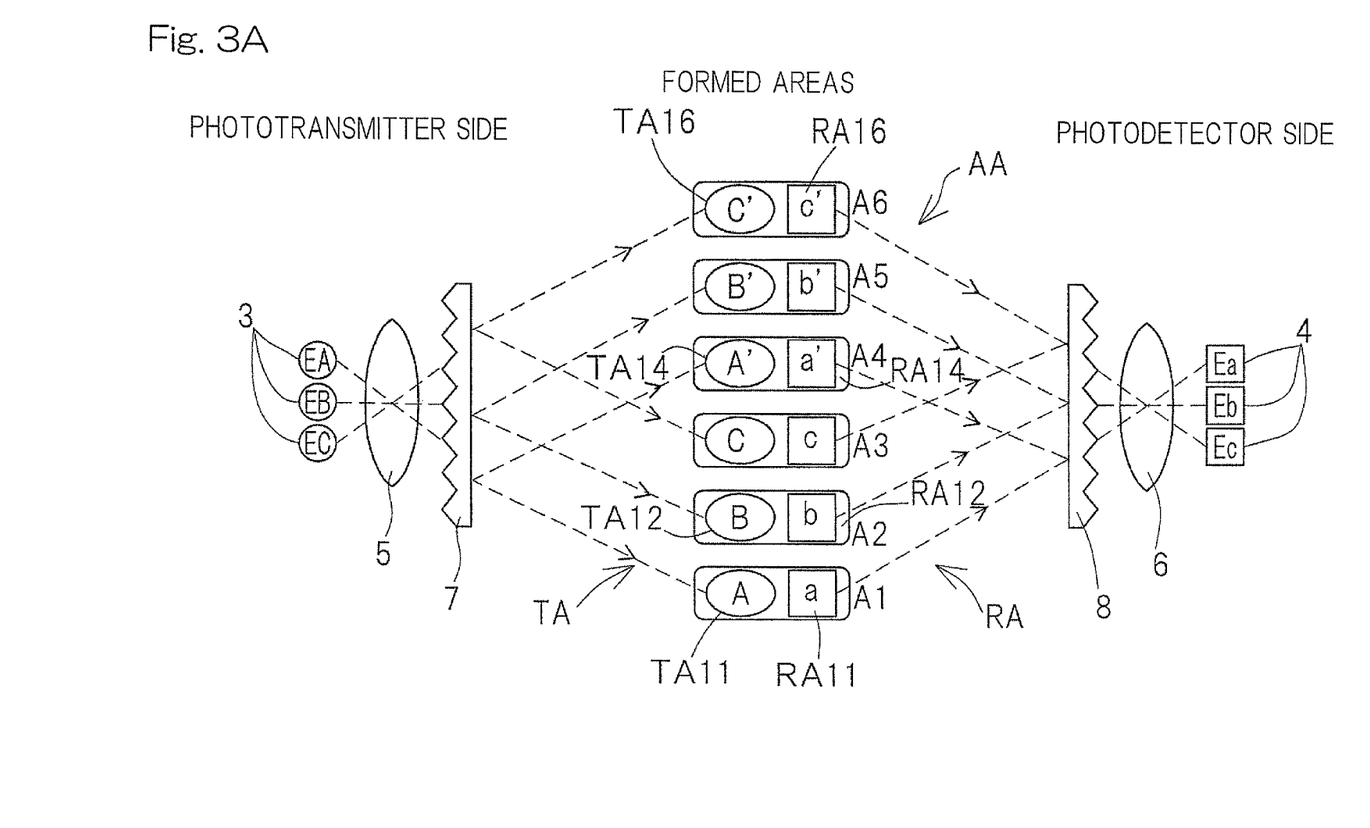
FIG. 3A is a schematic diagram illustrating a detection area in which a light transmission area by a phototransmitter element and a light reception area by a photodetector element are overlaid or overlapped on each other.

FIG. 3A shows an example of a sensor. The sensor includes three phototransmitter (transmitter) elements 3 (elements EA to EC) and three photodetector (receiver) elements 4 (elements Ea to Ec) that are paired, respectively, so as to form three pairs. On the phototransmitter (transmission) side, a light transmission area (transmission area) TA having six division areas is formed by the three phototransmitter elements 3, a lens body 5, and a phototransmitter-side prism 7. On the photodetector (reception) side, a light reception area (reception area) RA having six division areas is formed by the three photodetector elements 4, a lens body 6, and a photodetector-side prism 8. The light transmission area TA and the light reception area RA are overlaid or overlapped on each other to form a detection area AA. The prisms 7 and 8 each have, for example, a plurality of triangular portions each having two prism surfaces.

Figure 3B:
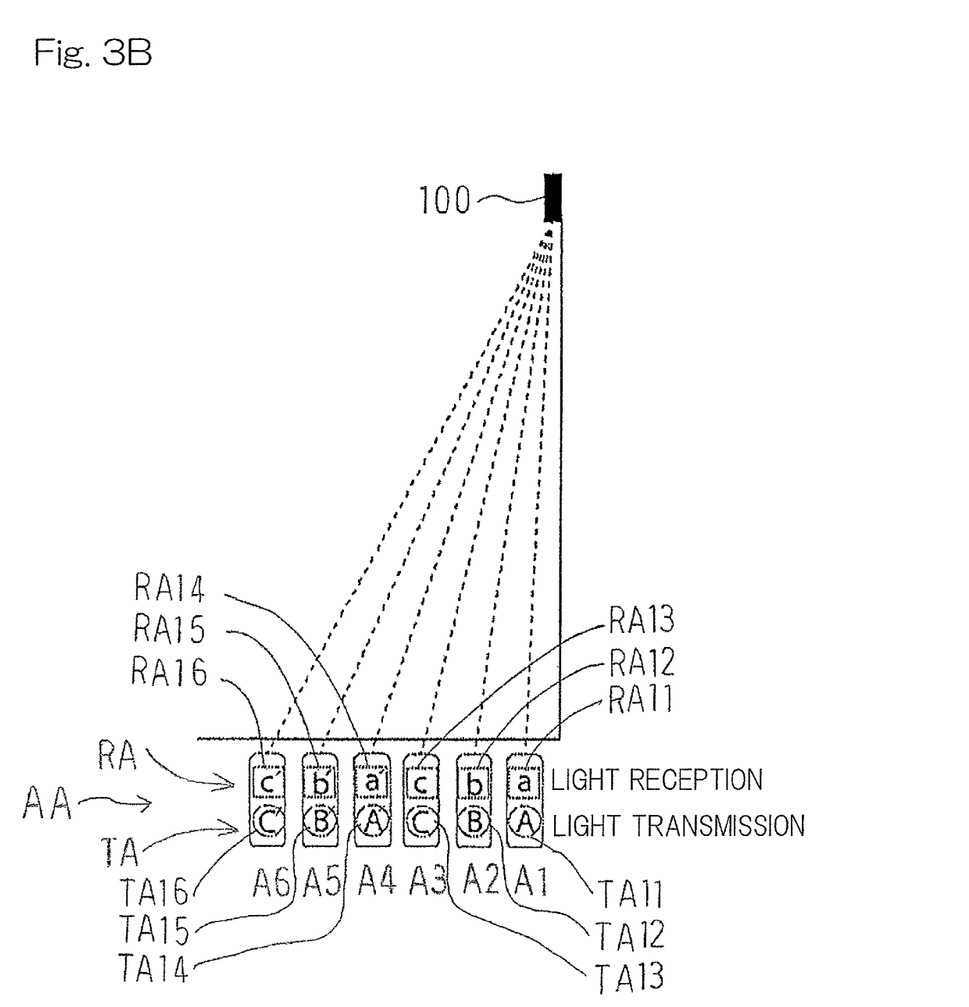
FIG. 3B is a side view of the detection area in which the light transmission area and the light reception areas are overlaid or overlapped on each other.

For example, a detection ray from an element EA of the phototransmitter element 3 is diffused by the two prism surfaces of the prism 7 in two directions, to form an area A of a division area TA11 and an area A' of a division area TA14 of the light transmission area TA, and detection rays are received by an element Ea of the photodetector element 4 via the two prism surfaces of the prism 8 from two directions, that is, from an area a of a division area RA11 and an area a' of a division area RA14 of the light reception area RA. A division area A1 of a first row or line is formed by the light transmission area TA11 and the light reception area RA11, and a division area A2 of a second row or line is formed by the light transmission area TA12 and the light reception area RA12. As shown in FIG. 3B, division areas A1 to A6 in which the light transmission areas TA11 to TA16 and the light reception areas RA11 to RA16 of six lines are overlaid or overlapped on each other in the longitudinal direction, are aligned from a position close to a sensor 100 toward a position distant from the sensor 110, to form the detection area AA. It is to be noted that a plurality of division areas are formed in the lateral direction for each of the six rows or lines of the division areas A1 to A6, which lateral division areas are not shown.

Figure 6A:
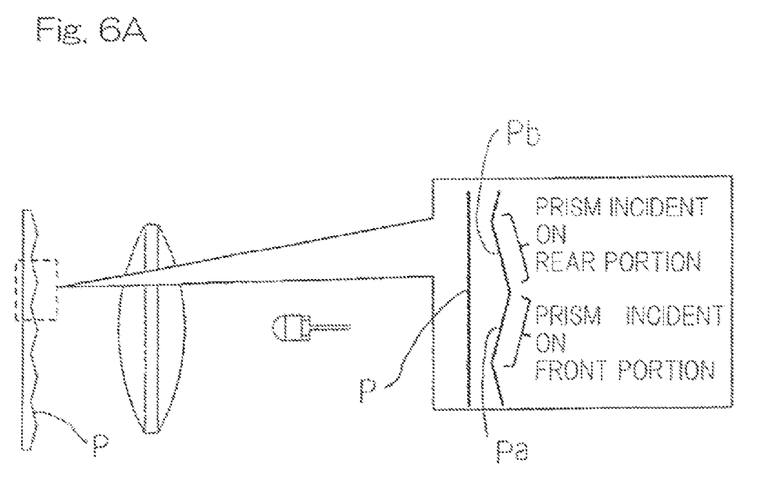
FIG. 6A is an enlarged cross-sectional view of a conventional prism.
Figure 6B:
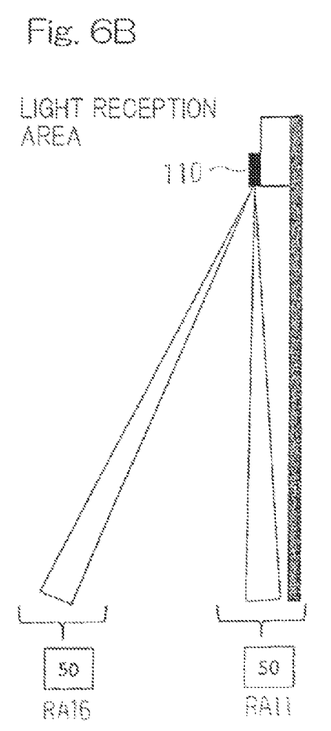
FIG. 6B is a side view of a light reception area on a photodetector side.
Figure 6C:
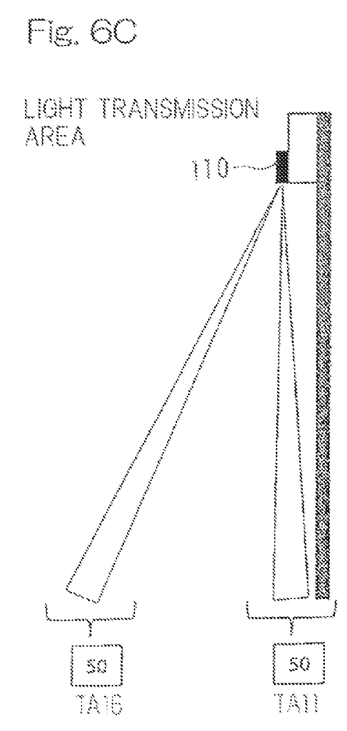
FIG. 6C is a side view of a light transmission area on a phototransmitter side.

FIG. 6A illustrates an example of a conventional sensor. In general, areas of two prism surfaces of a prism P are set such that a ratio between an area of a prism surface Pb by which a ray is applied to a rear portion corresponding to a short distance portion (closer to the sensor), and an area of a prism surface Pa by which a ray is applied to a front portion corresponding to a long distance portion (farther from the sensor) is 50:50 on each of the phototransmitter side and the photodetector side respectively. Therefore, as shown in FIG. 6B and FIG. 6C, the division areas RA11 and RA16, on the photodetector side, which are positioned at a position close to the sensor 110 having the prism P and a position distant from the sensor 110 having the prism P, respectively, are formed by prism surfaces having the same area, and the division areas TA11 and TA16, on the phototransmitter side, which are positioned at a position close to the sensor 110 having the prism P and a position distant from the sensor 110 having the prism P, respectively, are formed by prism surfaces having the same area.

When this sensor is used as an automatic door sensor, the longer a distance between the sensor and a division area of the detection area is, that is, the farther the division area of the detection area is from the automatic door toward the external region, the lower the detection sensitivity is likely to become. Therefore, in a case where a door is to be immediately opened for a person approaching the automatic door from the external region, a detection sensitivity for the distant division area is low and detection becomes difficult, to reduce a response speed. In this case, it can be considered that a detection sensitivity is enhanced. However, enhancement of detection sensitivity leads to increase of an influence of a noise, and an S/N ratio cannot be improved, to make improvement of detection performance difficult.

On the one hand, in a division area close to the automatic door, detection sensitivity is unnecessarily enhanced due to a short distance from the sensor, so that malfunction is likely to occur. Thus, in the case as described above, in the distant division area, detection performance cannot be improved, whereas, in the close division area, detection sensitivity is unnecessarily enhanced to increase the number of times of malfunction, and the sensor is impractical.

On the other hand, it is known that, in order to make the detection sensitivity uniform over the entirety of the detection area, an angle of the prism surface is varied (for example, Japanese Laid-Open Patent Publication No. 2004-170128). However, a mechanism for moving or rotating a prism the angle of which is gradually varied is necessary, and detection performance cannot be sufficiently improved for the distant division area.

SUMMARY OF THE INVENTION

The present invention has been made to solve the above problems and has an object to provide an active object detection sensor that is capable of improving detection performance even in a detection area that is distant from a sensor, to advantageously obtain balance in sensitivity and an S/N ratio over the entirety of the detection area with ease.

In order to attain the aforementioned object, an active object detection sensor of the present invention operates to form a detection area by a transmission area and a reception area each having a plurality of division areas, and detect an object in the detection area. The active object detection sensor includes: a plurality of transmitter elements each configured to transmit a detection ray for object detection, to the transmission area; a plurality of receiver elements each configured to receive the detection ray reflected by the object in the reception area; and a transmission-side optical divider and a reception-side optical divider, disposed in front of the transmitter elements and the receiver elements, respectively, wherein each optical divider includes a plurality of optical dividing pieces having a plurality of optical deflection surfaces on which an angle of traveling direction of the detection ray is varied to a plurality of angles so as to correspond to the plurality of the division areas. And each of the optical dividing pieces has a first optical deflection surface and a second optical deflection surface. In the optical dividers, a ratio of an area of the second optical deflection surface forming a division area that is closer to the sensor, relative to an area of the first optical deflection surface forming a division area that is farther from the sensor, is set so as to be different between a transmission side and a reception side.

With the plurality of optical deflection surfaces mentioned above on which a traveling direction angle of the detection ray is varied to a plurality of angles so as to correspond to the plurality of division areas, the phototransmitter-side optical divider varies an angle of a traveling direction of a detection ray, to a plurality of angles, for dividing toward the plurality of division areas, and the photodetector-side optical divider varies each traveling direction angle of the plurality of detection rays mentioned above, to equal in order to collect the detection rays from the plurality of division areas. So, in this configuration, the ratio of the area of the second optical deflection surface that forms the division area that is closer to the sensor, relative to the area of the first optical deflection surface that forms the division area that is farther from the sensor is set so as to be different between the transmission side and the reception side. Thus, by selecting the ratio of area, in each the division area, a transmission power on the transmission side and a detection sensitivity on the reception side can be adjusted in a given manner. Therefore, a predetermined detection sensitivity for the division area can be set according to a mounting environment without adjusting a transmission power of the transmitter itself. Even in the division area that is farther from the sensor, an S/N ratio can be enhanced and an object detection performance can be improved, and a balance in sensitivity and an S/N ratio can be advantageously adjusted over the entirety of the detection area with ease.

Preferably, on the transmission side, the ratio of the area of the second optical deflection surface to the area of the first optical deflection surface is set such that the area of the first optical deflection surface that forms a division area that is farther from the sensor is greater than the area of the second optical deflection surface that forms a division area that is closer to the sensor. Preferably, on the reception side, the ratio of the area of the second optical deflection surface to the area of the first optical deflection surface is set such that the area of the first optical deflection surface is less than the area of the second optical deflection surface. Then, the ratio of the area of the second optical deflection surface to the area of the first optical deflection surface on the reception side is set so as to be greater than the ratio of the area of the second optical deflection surface to the area of the first optical deflection surface on the transmission side.

In this case, an area of the first optical deflection surface that forms the division area that is farther from the sensor on the transmission side is made greater than an area of the second optical deflection surface that forms the division area that is closer to the sensor on the transmission side, and thus a transmission power can be increased in the division area. An area of the first optical deflection surface is made less than an area of the second optical deflection surface on the reception side, and thus a detection sensitivity can be reduced to reduce an influence of ambient light. Further, the ratio of the area of the second optical deflection surface to the area of the first optical deflection surface on the reception side is set so as to be greater than the ratio of the area of the second optical deflection surface to the area of the first optical deflection surface on the transmission side. Therefore, object detection performance for the division area that is farther from the sensor can be improved with ease. Thus, a balance in detection sensitivity and an S/N ratio can be advantageously adjusted over the entirety of the detection area.

Preferably, the ratio of the area of the second optical deflection surface to the area of the first optical deflection surface on the transmission side, and the ratio of the area of the second optical deflection surface to the area of the first optical deflection surface on the reception side are set so as to get close to each ratio in opposite directions, respectively, in magnitude relationship. Further, preferably, a ratio of the area of the second optical deflection surface to the area of the first optical deflection surface is set so as to be less than 1 on the transmission side, and is set so as to be greater than 1 on the reception side. In this case, a balance in detection sensitivity and an S/N ratio can be more advantageously adjusted over the entirety of the detection area.

Preferably, each of the optical divider is a prism having a plurality of prism surface that varies an angle of traveling direction of the detection ray, to a plurality of angles. Therefore, the division areas can be easily formed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
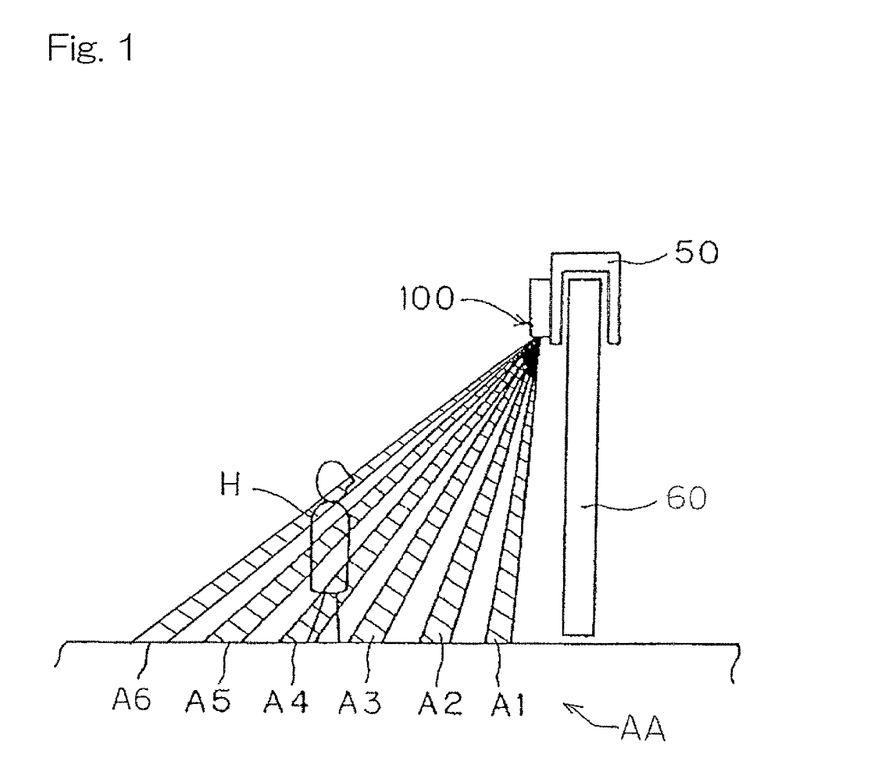
FIG. 1 illustrates a detection area as viewed from a sliding direction of an automatic door using an active object detection sensor for use in the automatic door according to one embodiment of the present invention.

Hereinafter, one embodiment of the present invention will be described with reference to the drawings. FIG. 1 illustrates a detection area AA, as viewed from a sliding direction of an automatic door 60, in the case of an active object detection sensor 100 for use in an automatic door being used for starting an opening/closing controller of the automatic door, according to one embodiment of the present invention. As shown in FIG. 1, the active object detection sensor 100 is provided in a transom 50, and the detection area AA is formed by six lines of division areas A1 to A6 in the longitudinal direction, from a position close to the sensor 100 toward a position distant from the sensor 100. In the detection area AA, an object such as a human body H is detected. It is to be noted that a plurality of division areas are formed also in the lateral direction for each of the division areas A1 to A6 of the six lines, which lateral division areas are not shown. The plurality of areas in the lateral direction may not be formed.

Figure 2A:
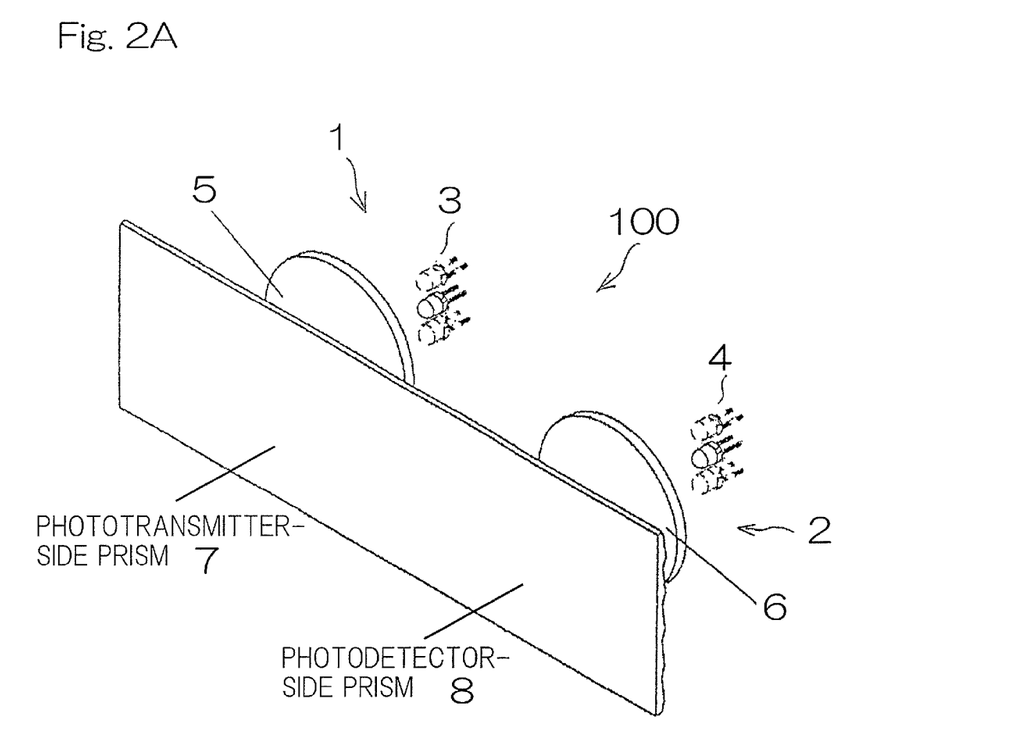
FIG. 2A is a schematic perspective view of the active object detection sensor.
Figure 2B:
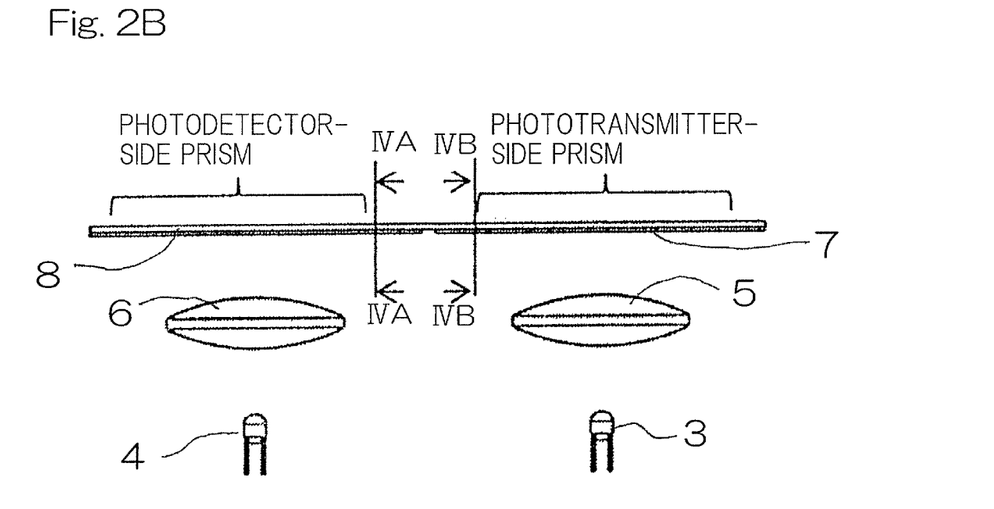
FIG. 2B is a plan view of the active object detection sensor.

As shown in FIG. 2A, the active object detection sensor 100 is, for example, an AIR (Active InfraRed detection) sensor, and includes: a phototransmitter (transmitter) 1 that transmits near infrared ray, as one kind of detection rays for object detection, toward the detection area AA described above; and a photodetector (receiver) 2 that receives detection ray reflected by an object to generate a light reception signal. FIG. 2B is a plan view of the sensor shown in FIG. 2A as viewed from above the sensor.

The phototransmitter 1 includes: for example, three transmitter elements (hereinafter, also referred to as phototransmitter elements) 3 including infrared emitting diodes for transmitting near infrared rays as detection rays; a lens body 5 disposed in front of the phototransmitter elements 3; and a phototransmitter-side optical divider 7, such as a prism, disposed in front of the lens body 5. The photodetector 2 includes: three receiver elements (hereinafter, also referred to as photodetector elements) 4; a lens body 6, disposed in front of the photodetector elements 4, for collecting near infrared rays reflected from the detection area AA such that the reflected near infrared rays are incident on each photodetector element 4; and a photodetector-side optical divider 8, such as a prism, disposed in front of the lens body 6. In FIG. 2, the optical divider 7 and the optical divider 8 are integrated with each other. However, the optical divider 7 and the optical divider 8 may be separately provided. The lens bodies 5 and 6 operate to define or constrain the detection area AA. Each of the optical dividers 7 and 8 has peaks and troughs extending in a lateral or horizontal direction.

As shown in FIG. 3A, on the phototransmitter (transmission) side, a light transmission area TA having six division areas TA11 to TA16 is formed by the three phototransmitter elements 3, the lens body 5, and the phototransmitter-side prism 7. On the photodetector (reception) side, a light reception area RA having six division areas RA11 to RA16 is formed by the three photodetector elements 4, the lens body 6, and the photodetector-side prism 8. The light transmission area TA and the light reception area RA each having six division areas are overlaid or overlapped on each other, to form the detection area AA having the division areas A1 to A6. As shown in FIG. 3B, for example, a division area A1 of a first row or line is formed by RA11 and TA11, and division areas are similarly formed up to a division area A6 of a sixth row or line formed by RA16 and TA16.

Figure 4A:
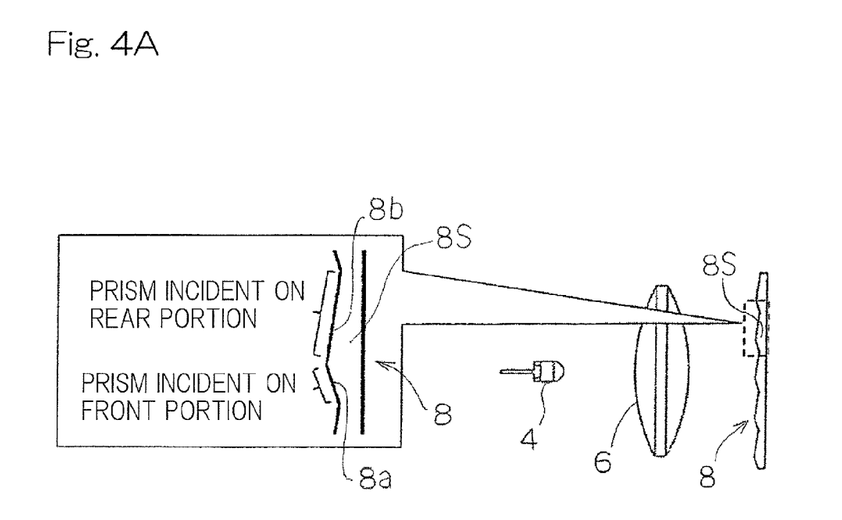
FIG. 4A is an enlarged cross-sectional view, taken along a line IVA-IVA in FIG. 2B, illustrating a prism on a photodetector side.
Figure 4B:
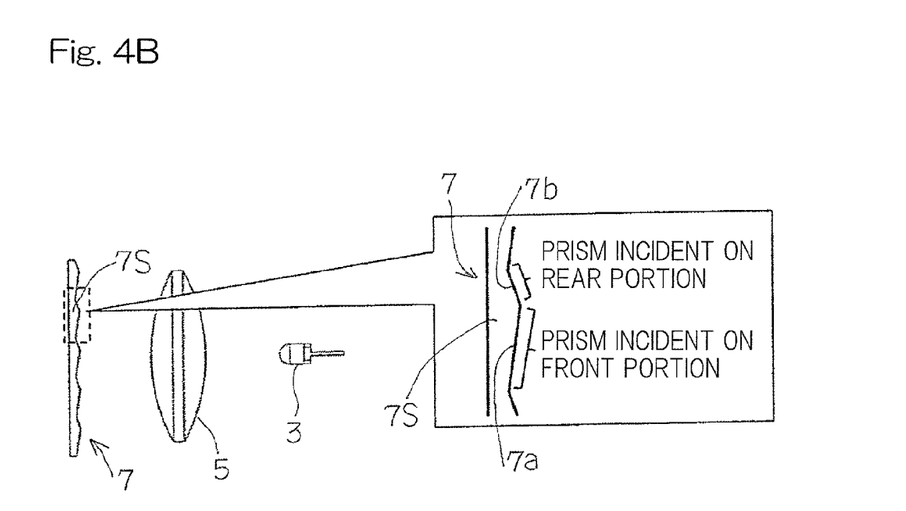
FIG. 4B is an enlarged cross-sectional view, taken along a line IVB-IVB in FIG. 2B, illustrating a prism on a phototransmitter side.

FIG. 4A and FIG. 4B are a cross-sectional view taken along a line IVA-IVA in FIG. 2B, and a cross-sectional view taken along a line IVB-IVB in FIG. 2B, respectively. As shown in FIG. 4B, the phototransmitter-side prism 7 has a plurality of optical dividing pieces (prism pieces) 7S having first and second optical deflection surfaces (prism surfaces) 7a, 7b that vary an angle of a traveling direction of a detection ray, to a plurality of angles, for example, two angles, for dividing toward the plurality of division areas, and the plurality of optical dividing pieces 7S are integrally formed. The first optical deflection surface 7a forms a division area that is farther from the sensor 100 (forms a front portion of the detection area). The second optical deflection surface 7b forms a division area that is closer to the sensor 100 (forms a rear portion of the detection area). In this example, an area of the first optical deflection surface 7a that forms a division area that is farther from the sensor 100 (in the light transmission area TA) is set so as to be greater than an area of the second optical deflection surface 7b that forms a division area that is closer to the sensor 100 (in the light transmission area TA). That is, on the phototransmitter side, a ratio of an area of the second optical deflection surface 7b to an area of the first optical deflection surface 7a is set so as to be less than 1.

As shown in FIG. 4A, the photodetector-side prism 8 has a plurality of optical dividing pieces (prism pieces) 8S having first and second optical deflection surfaces (prism surfaces) 8a, 8b that vary each angle of traveling directions (such as angles of incidence) of two aforementioned detection rays, to a single identical angle (such as a refracted output angle) so as to collect the detection rays from the plurality of division areas, and the plurality of optical dividing pieces 8S are integrally formed. The first optical deflection surface 8a forms a division area that is farther from the sensor 100 (forms a front portion of the detection area). The second optical deflection surface 8b forms a division area that is closer to the sensor 100 (forms a rear portion of the detection area). In this example, an area of the first optical deflection surface 8a that forms a division area that is farther from the sensor 100 (in the light transmission area RA) is set so as to be less than an area of the second optical deflection surface 8b that forms a division area that is closer to the sensor 100 (in the light transmission area RA). That is, on the photodetector side, a ratio of an area of the second optical deflection surface 8b to an area of the first optical deflection surface 8a is set so as to be greater than 1. It is to be noted that, on at least one of the phototransmitter side detection ray and the photodetector side detection ray, an angle of a traveling direction (such as the angle of incidence for the prism 7) of the detection ray is changed based on an angle of a given optical deflection surface, to enable the detection ray to be varied and assigned to any given division area.

Thus, in the plural optical deflection surfaces of the respective prism pieces 7S, 8S, a ratio of an area of the second optical deflection surface that forms the division area that is closer to the sensor, relative to an area of the first optical deflection surface that forms the division area that is farther from the sensor is set so as to be different between the transmission side and the reception side, and the ratio has a value different from 1 on both sides.

Figure 5A:
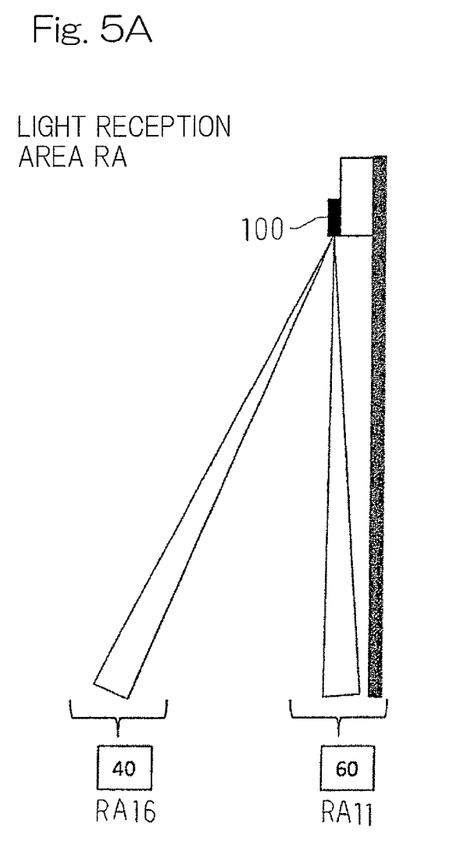
FIG. 5A is a side view of a light reception area on a photodetector side according to one example.
Figure 5B:
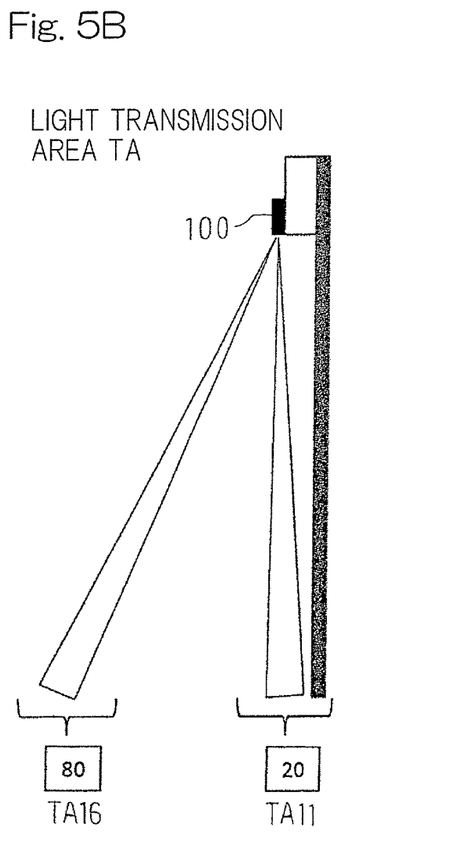
FIG. 5B is a side view of a light transmission area on a phototransmitter side according to one example.

For example, as indicated in one example shown in FIG. 5B, in the light transmission area TA, an area of the first optical deflection surface 7a that forms the division area TA16 farthest from the sensor 100 (forms the forefront of the detection area) is set to 80 that is greater than 50 in conventional art (FIG. 6C), and an area of the second optical deflection surface 7b that forms the division area TA11 closest to the sensor 100 (forms the rearmost portion of the detection area) is set to 20 that is much less than 50 in conventional art (FIG. 6C). Thus, the ratio of the area of the second optical deflection surface 7b to the area of the first optical deflection surface 7a is set to ¼ that is less than 1.

As shown in FIG. 5A, in the photodetector side, an area of the first optical deflection surface 8a that forms the division area RA16 farthest from the sensor 100 (forms the forefront portion of the detection area) is set to 40 that is slightly less than 50 in conventional art (FIG. 6B), and an area of the second optical deflection surface 8b that forms the division area RA11 closest to the sensor 100 (forms the rearmost portion of the detection area) is set to 60 that is slightly greater than 50 in conventional art (FIG. 6B). Thus, the ratio of the area of the second optical deflection surface 8b to the area of the first optical deflection surface 8a is set to 1.5 that is greater than 1. As above, the ratio of area on the transmission side and the ratio of area on the reception side are set so as to get close to each ratio in opposite directions, respectively, in magnitude relationship. Further, the ratio of area has a value different from 1 on each of the transmission side and the reception side.

When a light transmission power of the phototransmitter 1 itself is constant, each detection sensitivity for the division areas A1 to A6 of the detection area AA are in proportion to values obtained by multiplying values of the areas of the optical deflection surfaces for the division areas TA11 to TA16 of the light transmission area TA, by values of the areas of the optical deflection surfaces for the division areas RA11 to RA16 of the light reception area RA, respectively, since the detection area AA is formed by the division areas TA11 to TA16 of the light transmission area TA and the division areas RA11 to RA16 of the light reception area RA.

For example, a detection sensitivity of the division area A6 that is farthest from the sensor 100 is in proportion to a value obtained by multiplying the value, 80, of the area of the first optical deflection surface 7a that forms the division area TA16 of the light transmission area TA, by the value, 40, of the area of the first optical deflection surface 8a that forms the division area RA16 of the light reception area RA. Therefore, the detection sensitivity of the division area A6 represents a value, 3200, that is higher than 2500 (=50×50) (FIG. 6B, FIG. 6C) in conventional art. On the other hand, a detection sensitivity of the division area A1 that is closest to the sensor 100 is in proportion to a value obtained by multiplying the value, 20, of the area of the second optical deflection surface 7b that forms the division area TA11 of the light transmission area TA, by the value, 60, of the area of the second optical deflection surface 8b that forms the division area RA11 of the light reception area RA. Therefore, the detection sensitivity of the division area A1 represents a value, 1200, that is less than 2500 in conventional art.

That is, a detection sensitivity of the division area that is farther from the sensor 100 is increased as compared to a detection sensitivity of conventional art, and a detection sensitivity of the division area that is closer to the sensor 100 is reduced as compared to a detection sensitivity of conventional art.

Further, an amount of noise in the division area A6 that is farthest from the sensor 100 is in proportion to a value, 40, of an area of the first optical deflection surface 8a that forms the division area RA16 of the light reception area RA, and the amount of noise represents a value, 40, that is less than 50 in conventional art. On the other hand, an amount of noise in the division area A1 that is closest to the sensor 100 is in proportion to a value, 60, of an area of the second optical deflection surface 8b that forms the division area RA11 of the light reception area RA, and the amount of noise represents a value, 60, that is higher than 50 in conventional art.

That is, an influence of a noise in the division area that is farther from the sensor 100 is reduced as compared to conventional art, and an influence of a noise in the division area that is closer to the sensor 100 is increased as compared to conventional art.

A ratio between an S/N ratio for the division area A6 that is farther from the sensor 100 and an S/N ratio for the division area A1 that is close to the sensor 100 is compared between the present embodiment and a conventional art, and the results are as follows.

In a conventional art, S/N (A6):S/N (A1)=2500/50:2500/50=1:1

In the present embodiment, S/N (A6):S/N (A1)=3200/40: 1200/60=4:1

In this case, it appears that a balance in the present embodiment is reduced or is worse than the conventional art since the S/N ratio is different depending on whether the division area is closer to the sensor 100 or farther from the sensor 100. However, the balance is not reduced. In practical use, the same object enters the division area A6 and the division area A1 in general, and a signal value detected in the division area A1 is greater than a signal value detected in the division area A6 even for the same object since the division area A1 is closer to the sensor 100 than the division area A6 is. If the signal value of the division area A1 is four times greater than the signal value of the division area A6, the balance based on the above ratio is very advantageous.

Thus, in the present embodiment, an influence of a nose in the division area that is closer to the sensor can be also considered while object detection performance for the division area that is farther from the sensor can be improved.

Therefore, a ratio of an area of the second optical deflection surface 7b to an area of the first optical deflection surface 7a on the phototransmitter side is set so as to be less than a ratio of an area of the second optical deflection surface 8b to an area of the first optical deflection surface 8a on the photodetector side. Further, a ratio of an area of the second optical deflection surface 7b to an area of the first optical deflection surface 7a on the phototransmitter side and a ratio of an area of the second optical deflection surface 8b to an area of the first optical deflection surface 8a on the photodetector side are set so as to get close to each ratio in opposite directions, respectively, in magnitude relationship. Further, a ratio of an area of the second optical deflection surface to an area of the first optical deflection surface is set so as to be less than 1 on the phototransmitter side, and is set so as to be greater than 1 on the photodetector side. In this case, a balance in sensitivity and an S/N ratio can be advantageously adjusted over the entirety of the detection area.

In the above configuration, the automatic door apparatus shown in FIG. 1 determines whether or not a light reception signal that is individually inputted from the photodetector elements 4 for each line has a level that exceeds a setting level. When the automatic door apparatus determines that the light reception signal has a level that exceeds the setting level, it outputs an object detection signal to a not-illustrated opening/closing controller of the automatic door 60. According to the object detection signal, the automatic door 60 is opened or closed.

Thus, in the present embodiment, the ratio of the area of the second optical deflection surface that forms the division area that is closer to the sensor, relative to the area of the first optical deflection surface that forms the division area that is farther from the sensor is set so as to be different between the transmission side and the reception side. Thus, by selecting the ratio of area, in each division area, a transmission power on the phototransmitter (transmission) side and a detection sensitivity on the photodetector (reception) side can be adjusted in a given manner. Therefore, a predetermined detection sensitivity for the division area can be set according to a mounting environment without adjusting a transmission power of the transmitter itself. Even in the division area that is farther from the sensor, an object detection performance can be improved, and a balance in sensitivity and an S/N ratio can be advantageously adjusted over the entirety of the detection area with ease.

A main axis, such as an optical axis, of the lens body on the phototransmitter side is adjusted to the phototransmitter element that forms the division area that is farther from the sensor, and a main axis, such as an optical axis, of the lens body on the photodetector side is adjusted to the photodetector element that forms the division area that is closer to the sensor, to enable adjustment of an S/N ratio. However, a division area that is formed by a detection ray of an element deviated from the main axis is likely to be unfocused. Further, by the size of the lens body on the phototransmitter side being increased and by the size of the lens body on the photodetector side being reduced, the S/N ratio can be adjusted. However, different size lenses are necessary, which causes increase in cost.

In each embodiment, near infrared rays are used as detection rays. However, detection rays are not limited to near infrared rays. For example, visible light, infrared rays, microwaves, or laser light may be used.

In each embodiment, a prism is used as an optical divider. However, the optical divider is not limited to a prism. For example, a mirror having a plurality of optical deflection surfaces (mirror surfaces) may be used. Further, an optical divider for division into three or more may be used instead of the aforementioned optical divider for division into two.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . phototransmitter (transmitter)
2 . . . photodetector (receiver)
3 . . . phototransmitter (transmitter) element
4 . . . photodetector (receiver) element
5, 6 . . . lens body
7 . . . phototransmitter-side optical divider (prism)
7S . . . optical dividing piece (prism piece)
7a . . . first optical deflection surface (prism surface)
7b . . . second optical deflection surface (prism surface)
8 . . . photodetector-side optical divider (prism)
8S . . . optical dividing piece (prism piece)
8a . . . first optical deflection surface (prism surface)
8b . . . second optical deflection surface (prism surface)
60 . . . automatic door
100 . . . active object detection sensor
AA . . . detection area
A1 to A6 . . . division area
TA . . . light transmission area (transmission area)
TA11 to TA16 . . . division area
RA . . . light reception area (reception area)
RA11 to RA16 . . . division area

What is claimed is:

1. An active object detection sensor that operates to form a detection area by a transmission area and a reception area each having a plurality of division areas, and detect an object in the detection area, the active object detection sensor comprising:
a plurality of transmitter elements each configured to transmit a detection ray for object detection, to the transmission area;
a plurality of receiver elements each configured to receive the detection ray reflected by the object in the reception area; and
a transmission-side optical divider and a reception-side optical divider, disposed in front of the transmitter elements and the receiver elements, respectively,
wherein each optical divider includes a plurality of optical dividing pieces having a plurality of optical deflection surfaces on which an angle of traveling direction of the detection ray is varied to a plurality of angles so as to correspond to the plurality of the division areas, and
wherein each of the optical dividing pieces has a first optical deflection surface and a second optical deflection surface, a ratio of an area of the second optical deflection surface forming a division area that is closer to the sensor, relative to an area of the first optical deflection surface forming a division area that is farther from the sensor, being set so as to be different between a transmission side and a reception side.

2. The active object detection sensor as claimed in claim 1, wherein
on the transmission side, the ratio of the area of the second optical deflection surface to the area of the first optical deflection surface is set such that the area of the first optical deflection surface is greater than the area of the second optical deflection surface, and
on the reception side, the ratio of the area of the second optical deflection surface to the area of the first optical deflection surface is set such that the area of the first optical deflection surface is less than the area of the second optical deflection surface,
the ratio of the area of the second optical deflection surface to the area of the first optical deflection surface on the reception side is set so as to be greater than the ratio of the area of the second optical deflection surface to the area of the first optical deflection surface on the transmission side.

3. The active object detection sensor as claimed in claim 1, wherein the ratio of the area of the second optical deflection surface to the area of the first optical deflection surface on the transmission side, and the ratio of the area of the second optical deflection surface to the area of the first optical deflection surface on the reception side are set so as to get close to each ratio in opposite directions, respectively, in magnitude relationship.

4. The active object detection sensor as claimed in claim 1, wherein each of the optical divider is a prism having a plurality of prism surface that varies an angle of traveling direction of the detection ray, to a plurality of angles.

* * * * *